United States Patent [19]

Allen, Jr.

[11] Patent Number: 5,216,977

[45] Date of Patent: Jun. 8, 1993

[54] ANIMAL SHELTER

[76] Inventor: Robert Allen, Jr., 3660 E. Fall Creek Blvd., Indianapolis, Ind. 46220

[21] Appl. No.: 946,134

[22] Filed: Sep. 17, 1992

[51] Int. Cl.$^5$ .............................................. A01K 1/02
[52] U.S. Cl. ...................................................... 119/19
[58] Field of Search ....................... 119/15, 17, 19, 20, 119/161, 165, 31, 35, 39

[56] References Cited

U.S. PATENT DOCUMENTS

| 3,237,599 | 3/1966 | Torrey et al. | 119/39 |
| 3,397,676 | 8/1968 | Barney | 119/15 |
| 3,962,993 | 6/1976 | Dattilo | 119/19 |
| 3,985,102 | 10/1976 | Yonezawa | 119/19 |
| 4,526,133 | 7/1985 | LoMaglio | 119/17 |
| 4,827,872 | 5/1989 | Sommers | 119/19 |

Primary Examiner—Gene Mancene
Assistant Examiner—Thomas Price
Attorney, Agent, or Firm—John H. Calhoun, Jr.

[57] ABSTRACT

A mobile, insulated, and compartmented animal shelter having a living compartment and an overhead loft. The loft is provided with an electric heating system mounted on a pallet that may be slid into and out of the loft through a hinged access door. An air duct conveys warm air from the heater through outlets in the duct, pallet and ceiling panel and into the living compartment.

1 Claim, 4 Drawing Sheets

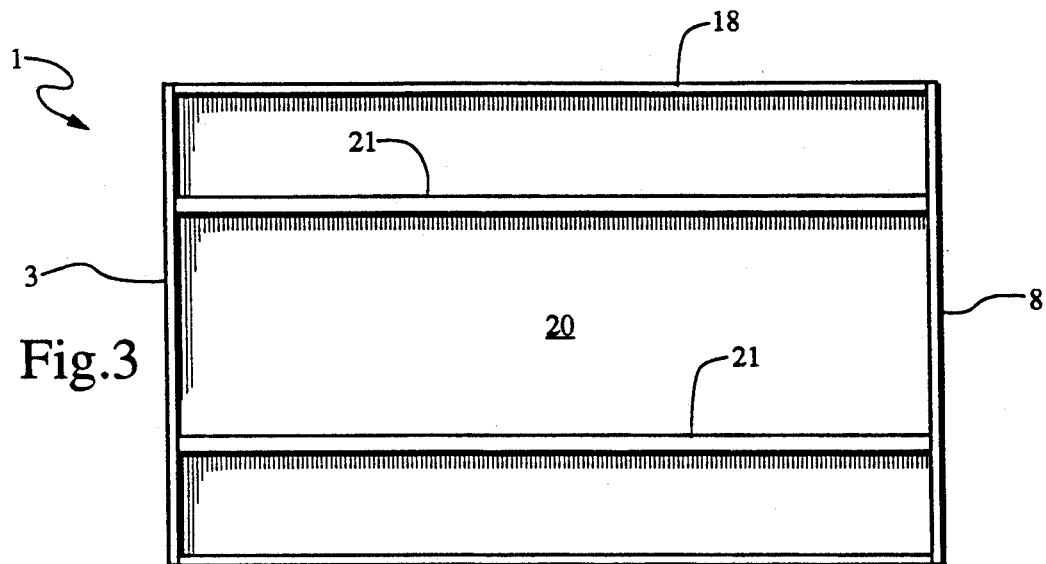
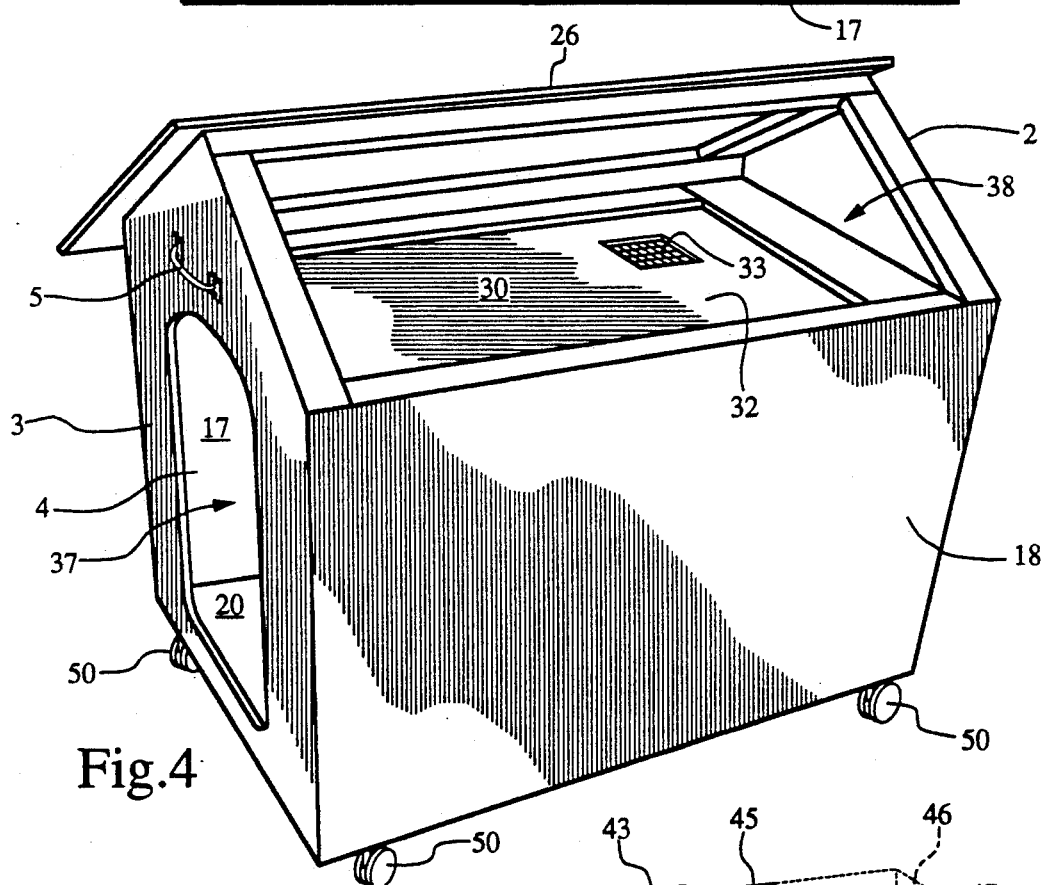
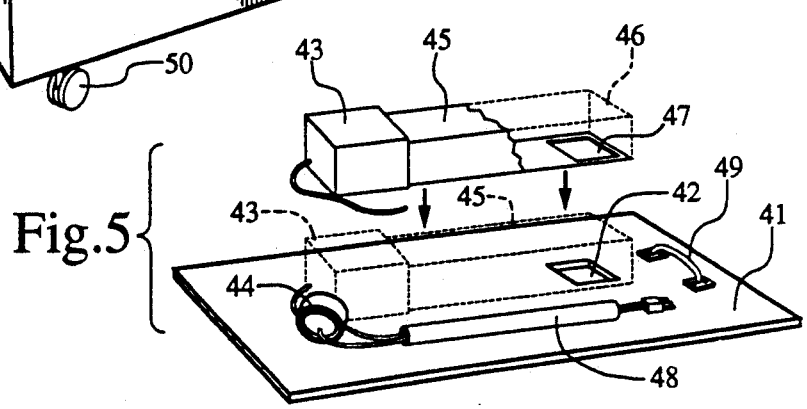

ANIMAL SHELTER

BACKGROUND OF THE INVENTION

This invention relates to new and useful improvements to animal shelters, and more particularly to animal shelters of the kind that are used for housing dogs and the like, commonly referred to as dog houses.

Animal shelters are known in the prior art as illustrated by U.S. Pat. No. 2,252,191 which issued to Wade E. Marks on Aug. 12, 1941, and which shows a heatable small animal incubator. U.S. Pat. No. 2,821,165 which issued to Venita A. Wright on Jan. 28, 1958 shows a mobile pet home. U.S. Pat. No. 3,601,096 which issued to Dwayne C. Rutherford on Aug. 24, 1971 shows a ventilating and control system for a swine house. U.S. Pat. No. 3,877,420 which issued to John M. Eagleson, Jr. on Apr. 15, 1975 shows a controlled environment animal housing system.

The present invention provides a novel and useful animal shelter that can be used for protecting dogs and other animals from the elements and which has the additional feature that it can be heated in the winter.

SUMMARY OF THE INVENTION

The shelter of the present invention has all the advantages of shelters known in the prior art, and in addition it provides several distinct and important advantages not found in previously known shelters.

A common problem with shelters heretofore known in the art is a tendency for the shelters to be cheaply constructed with only minimal consideration for the comfort of the animal that is to occupy the structure.

A primary objective of the present invention is to provide a shelter that is sturdily constructed and that will provide maximum comfort for an occupant even during the worst weather.

Another object of the present invention is to provide a shelter that is heatable during cold weather.

Another object of the present invention is to provide a shelter that is well insulated from the cold.

Another object of the present invention is to provide a shelter with a heating system that it easy to construct, install, remove and repair.

Another object of the present invention is to provide a heated shelter that is simple in construction, inexpensive, strong and durable, and well adapted for the purposes for which it is designed.

Another object of the present invention is to provide a heated shelter that may be conveniently moved from place to place.

Another object of the present invention is to provide a heated shelter that provides for satisfying some of the hygienic needs of an occupant.

Other objects and advantages of the present invention will become apparent from a consideration of the following detailed description taken in connection with the accompanying drawings wherein a preferred embodiment of the invention is shown.

It should be understood that the invention is not limited to the details disclosed, but includes all such variations and modifications as fall within the spirit of the invention and the scope of the appended claims.

This invention contemplates shelters of different sizes and architectural designs and various commonly known heating systems.

The objectives of the present invention are accomplished by providing a shelter comprising a building structure having a living compartment with a loft area above, adapted for installation of a system for heating the living compartment. The structure comprises a front panel having a door opening therethrough and a handle adapted for pulling the structure when it is optionally mounted on wheels, a back panel, a first side panel, a second side panel, a bottom panel having integral therewith a plurality of supports adapted to keep the structure off the ground, and having means thereon for mounting a plurality of casters for rolling the structure from place to place, a pitched roof, a deodorizing means, and a sleeping pad; said front, back, sides, bottom and roof being assembled to provide an enclosure suitable for occupancy by a dog or other animal.

The front, back, side, bottom and roof panels are of an insulated sandwich construction.

An insulated ceiling panel separates the living compartment from the loft, said panel being adapted to allow the passage of warm air from a heating duct in the loft into the living compartment.

A hinged loft access door is provided in the back of the structure, having provided therefor a plurality of latches to secure the door in a closed position and a handle for convenience in operating the door.

The heating system is assembled on a pallet that can be easily slid into and out of the loft through the access door in the back of the structure, and which is provided with a handle for convenience in slidably inserting and removing the pallet. The pallet is adapted to allow the passage of warm air from a heating duct in the loft into the living compartment.

The heating system comprises a heater, a duct for conveying heated air from the heater to an opening in the pallet which is adapted to be aligned with an opening in the back of the ceiling panel. A cooling fan is provided for cooling the loft, along with necessary electrical service for powering the heater and fan. In operation, warm air is blown into the back of the living compartment, tending to force cold air out the front.

An occupant's hygienic needs are ministered to by providing a detachable and re-fillable deodorizer, comprising a container having stored therein a deodorizer material such, for example, as sodium bicarbonate, said container having an opening thererthrough adapted to allow the air in the living compartment to communicate with the air in the deodorizer; and a removable rug or other soft and washable sleeping pad adapted to cover the inside surface of the floor of the structure.

BRIEF DESCRIPTION OF THE DRAWINGS

A preferred embodiment of the present invention is illustrated in the accompanying drawings in which:

FIG. 3 is a bottom view of the same;

FIG. 4 is top-side view in perspective of the shelter with one side of the roof removed to expose the ceiling panel and FIG. 5 is an exploded view of the heater assembly of the present invention;

DESCRIPTION OF THE PREFERRED EMBODIMENT

Figure 1:
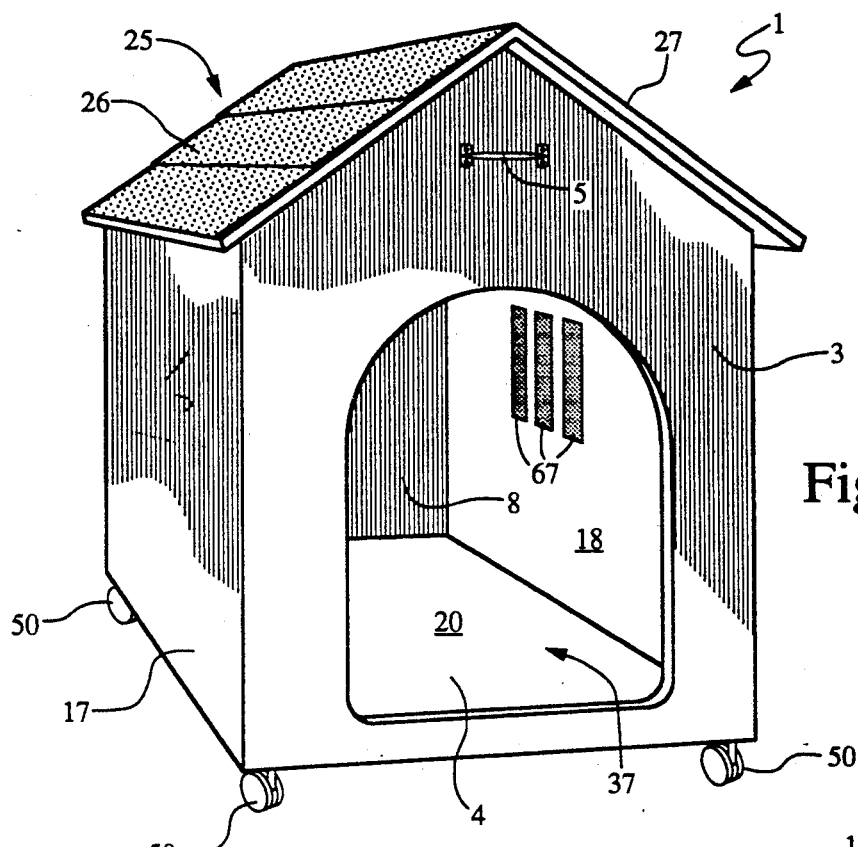
FIG. 1 is a front view in perspective of the shelter of the present invention.

Referring now to the drawings in greater detail, FIGS. 1-4, 6, 8 and 9 illustrate the shelter of the present invention, shown generally at 1. The shelter 1, comprises a frame 2, a front panel 3, a back panel 8, a first side panel 17, a second side panel 18, a bottom panel 20, and a pitched roof 25, comprising a first roof panel 26 and a second roof panel 27, and a ceiling panel 30 that divides the structure 1 into a living compartment 37 having a loft 38 thereabove. All of the said panels 2, 8, 17, 18, 20, 26, 27, 30 are of the insulated sandwich construction type illustrated in FIG. 7, each panel comprising a pair of outer sheathing members 34, 35 having sandwiched therebetween a layer of insulation 36. The panels 3, 8, 17, 18, 20, 26, 27, 30 are closely fitted together at their respective interfaces to provide a relatively draft free enclosure.

Figure 6:
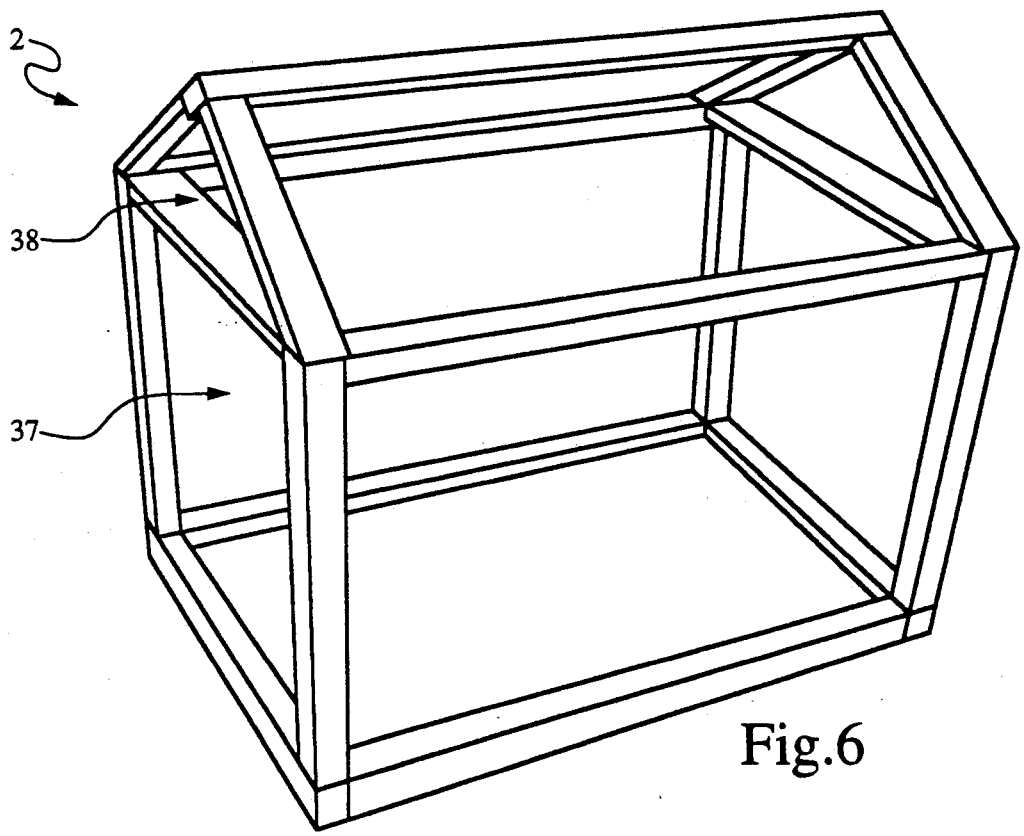
FIG. 6 is a view in perspective of a frame of the shelter.
Figure 7:
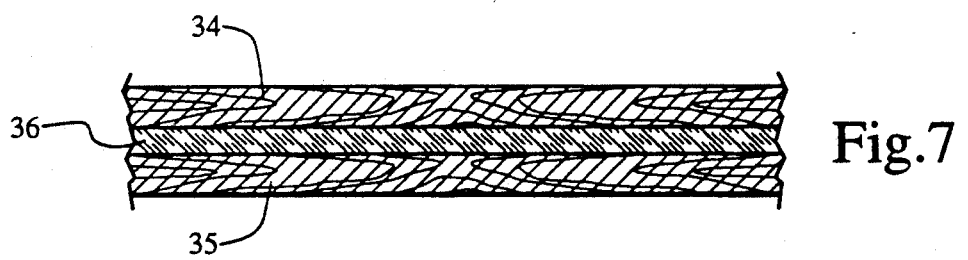
FIG. 7 is a sectional view through a panel of the present invention.
Figures 10, 11:
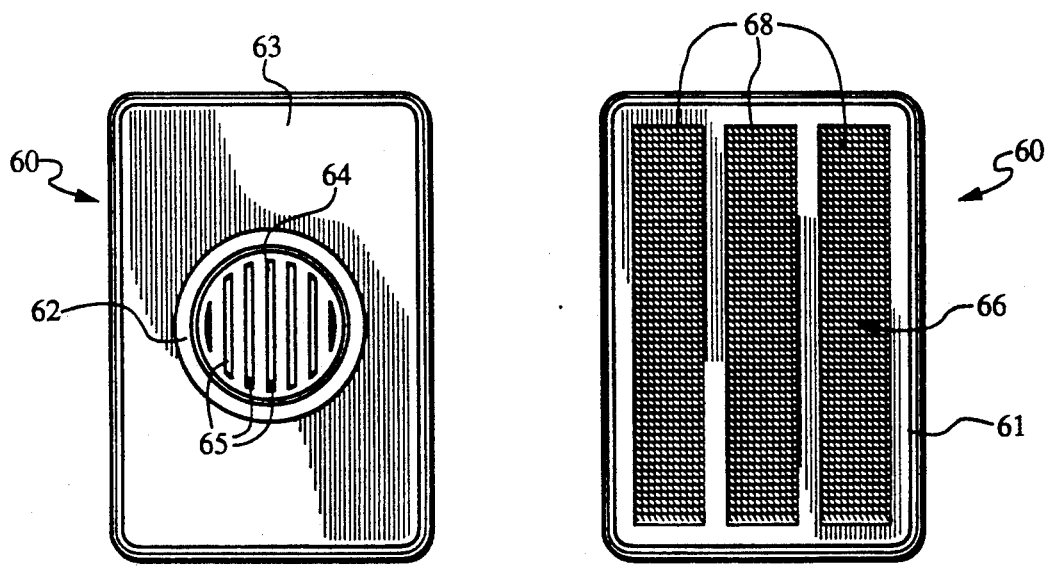
FIG. 10 is a front view of a deodorizer of the present invention.
FIG. 11 is a back view of the deodorizer.

As best illustrated in FIG. 1, the front panel 3 is adapted to be secured to the frame 2 [best shown in FIG. 6]and to fit closely under the roof panels 26, 27. The front panel 3 is provided with a door 4 therethrough adapted for ingress and egress of a dog or other animal, and a handle 5 to facilitate pulling the shelter which may be mounted on casters 50.

Figure 2:
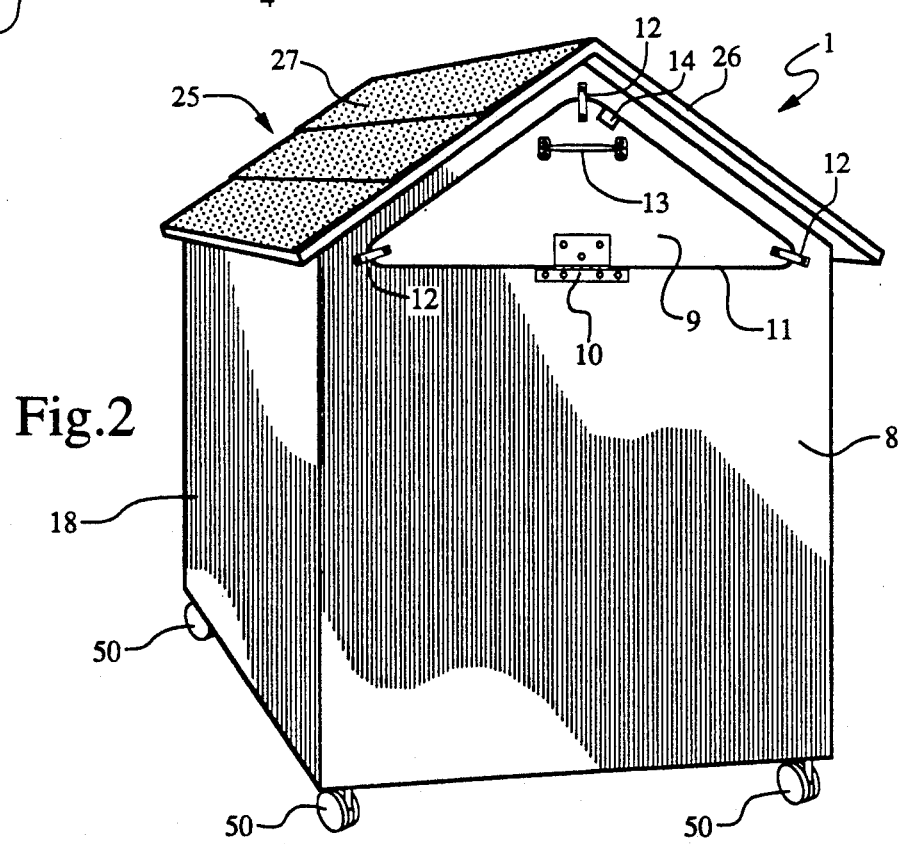
FIG. 2 is a back view in perspective of the same.

As best illustrated in FIG. 2, the back panel 8 is adapted to be secured to the frame 2 and to fit closely under the roof panels 26, 27. The said back panel 8 is provided with a hinged door 9 therethrough adapted for inserting and removing a heater assembly 40 described below. In the illustrated embodiment, a single hinge 10 is provided at the bottom 11 of the door 9; however in alternate embodiments of my invention other hinge arrangements may be employed. The illustrated embodiment shows a plurality of twistable latches 12, each of which is adapted to lock the door 9 in its closed position. A handle 13 is provided on the outside of the door 9 to facilitate controlling the raising and lowering the door 9, and a notch 14 is provided in the door 9 through which a power service cord [not shown]may be passed.

Two like side panels 17, 18 are provided, as illustrated in FIG. 3. Each side panel 17, 18 encloses a side of the structure 1 from the roof 25 to the bottom 20 and from the front 3 to the back 8.

The bottom panel 20 encloses the bottom of the structure 1 from front 3 to back 8 and from side 17 to side 18. A plurality of supports 21 is provided on the bottom panel 20 to keep the structure 1 off the ground, said supports 21 being shown as a pair of longitudinal beams joined to the bottom. In the illustrated embodiment a plurality of casters 50 is attached to the bottom 20 to facilitate moving the structure by rolling it.

The roof panels 26, 27 enclose the top of the structure 1, and are pitched to provide for runoff of rainwater.

As shown in FIG. 4, the insulated ceiling panel 30 extends from front 3 to back 8 and from side 26 to side 27 and divides the structure into a living compartment 37 and a loft 38. A moisture barrier 32 is provided on the upper surface 31 of the ceiling panel 30, and a vent opening 33 is provided near the back of the ceiling panel 30, which opening 33 is adapted to be aligned with a similar opening 42 in the heater pallet 41 to allow warm air to be blown from the heater assembly 40 into the living compartment 37.

Figure 8:
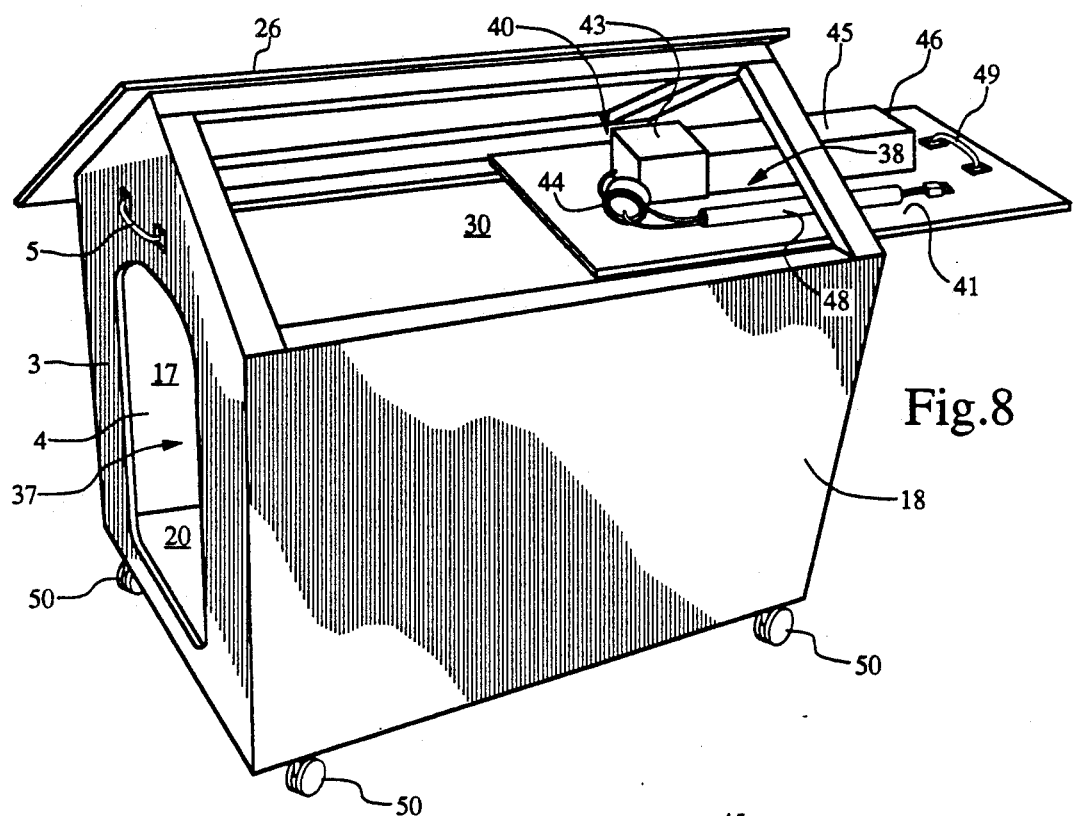
FIG. 8 is top-side view in perspective of the shelter with one side of the roof removed and the heating pallet slid approximately half way into the loft.
Figure 9:
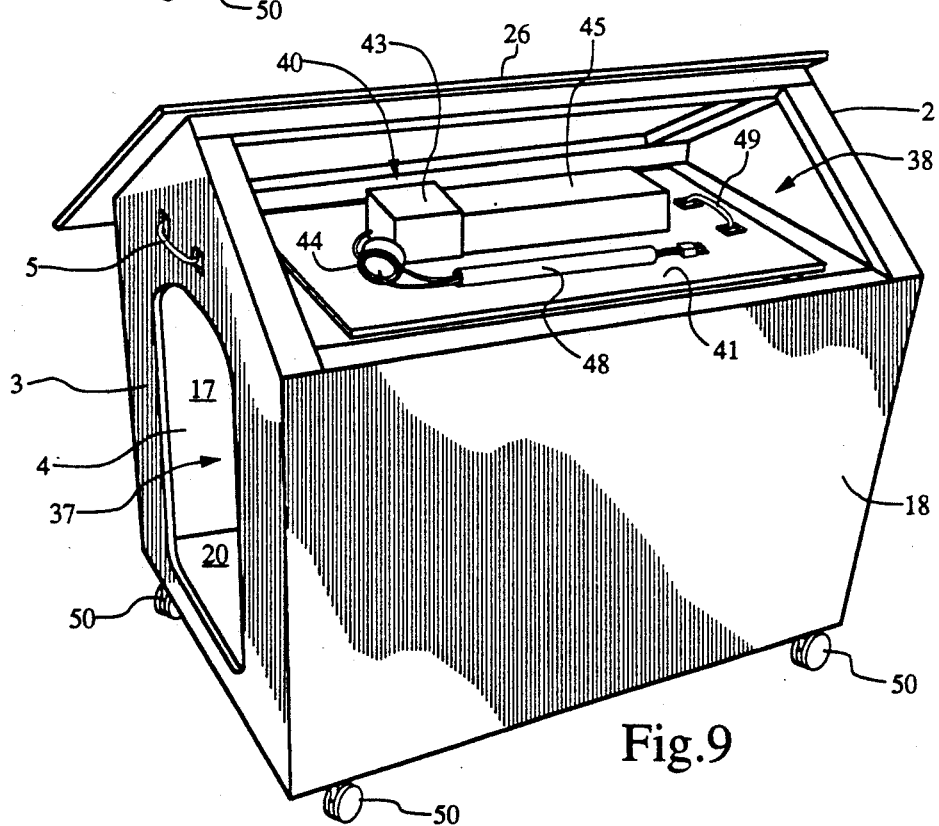
FIG. 9 is top-side view in perspective of the shelter with one side of the roof removed and the heating pallet slid all the way into the loft.

A heater assembly illustrated in FIGS. 8 and 9 may be slidably inserted into and removed from the loft 38. FIG. 8 shows the loft with the heater assembly 40 partly inserted, and FIG. 9 with the heater assembly 40 inserted all the way in.

The heater assembly 40 comprises a pallet 41 having an opening 42 therethrough adapted to be aligned with the opening 33 in the ceiling panel 30 and adapted to allow the passage of warm air from a warm air duct 45 into the living compartment 37. Mounted on the said pallet 41 are an electric heater 43 with a built in blower motor [not shown], a fan 44 adapted for cooling the heater 43 and the loft 38, a warm air duct 45 extending from the heater output to the back of the pallet 41. The distal end 46 of the duct 45 is sealed, and an opening 47 is provided in the bottom at the distal end of the duct 45, which opening is adapted to be aligned with the opening 42 in the pallet 41 and the opening 33 in the ceiling panel 30 and adapted to allow the passage of warm air from the warm air duct 45 into the living compartment 37. Also mounted on the pallet 41 are means 48 for connecting the heater 43 and fan 44 to an electrical cord [not shown] that may be run from a power source through the notch 14 in the back door 9 into the loft 38. The heater pallet 41 is adapted to slide over the frame 2 and into and out of the loft 38 through the back door 9, and a handle 49 is provided for convenience in pushing and pulling the pallet 41.

A detachable deodorizer 60 is also provided. The deodorizer comprises a box-like container 61 having an closable opening 62 therethrough and a removable lid 63 adapted to close the said opening. The deodorizer 60 may be filled through the opening 62 with a deodorizer material such, for example, as sodium bicarbonate. A screened opening 65 is provided through the container 61 to allow the air in the living compartment 37 to communicate with the deodorizer material 64. Attachment means 66 are provided for detachably securing the deodorizer 60 to the inside of the structure 1. In the illustrated embodiment, the said attachment means 66 comprise a first plurality of Velcro$^R$ strips 67 of the hook or loop type permanently attached to the inside of a side wall 17, 18 of the structure, and a second plurality of Velcro$^R$ strips 68 of the loop or hook type permanently attached to a side of the said deodorizer 60. The deodorizer 60 may be filled with deodorizing material 64 through an opening 62 which may then be covered by the lid 63. The deodorizer 60 may then be mounted onto a side wall 17, 18 or other part of the living compartment 37 by pressing the first plurality of Velcro® strips against the second plurality of Velcro®strips, and may be removed by simply pulling the said strips apart.

A sleeping pad is also provided for an occupant's additional comfort, said pad comprising rug or other soft and washable floor cover.

To use the structure, a person merely places it in a desired location, opens the back door 9, slides the heater assembly 40 out, connects the heater 43 and fan 44 to a suitable power source by means of an electrical cable, slides the heater assembly 40 back into the loft 38 and closes the back door 9 while running the power cable through the notch 14 in the door 9, and locks the door 9 using the plurality of latches 12 provided for that purpose.

Having thus described my invention, what I now claim is:

1. A portable animal shelter having a first compartment adapted for occupancy by an animal and a second compartment adapted for the installation of a heating system, said compartments being separated by a ceiling panel having an opening therethrough that is adapted to allow the passage of warm air from a heating duct in a heater assembly in the second compartment into the first compartment, said panel having provided thereon a moisture barrier adapted to inhibit the flow of moisture from the first compartment to the second compartment and from the second compartment to the first compartment; said structure comprising a front panel, a back panel, a first side panel, a second side panel, a bottom panel, and a pitched roof comprising a pair of roof panels, said front, back, side, bottom, roof and ceiling panels being made of insulated sandwich construction; and wherein the said front panel is provided with an opening therethrough adapted for ingress and egress into and out of the first compartment by an animal and a handle mounted thereon adapted for pulling the shelter; and wherein the said back panel is provided with a hinged access door mounted therein, a plurality of latches adapted to secure the hinged access door in a closed position, a handle mounted on the hinged access door and adapted to facilitate operating the hinged access door and means for inserting electrical wiring through the hinged access door and into the second compartment; and wherein the said bottom panel is provided with a plurality of support means mounted thereon and adapted to keep the shelter off the ground said supports having provided thereon attachment means adapted for mounting a plurality of casters to the bottom of the shelter off the ground said supports having provided thereon attachment means adapted for mounting a plurality of casters to the bottom of the shelter; a plurality of casters mounted on the bottom of the shelter and adapted to roll the said shelter from place to place; a heating system comprising a pallet that is adapted to be slid into and out of the second compartment through the hinged access door, said pallet having provided therethrough an opening adapted to be aligned with an opening in an air duct and the opening in the ceiling panel to allow the passage of warm air from a heating duct on the pallet into the first compartment and said pallet having mounted thereon a handle adapted to facillitate sliding the pallet into and out of the second compartment, a heater adapted to heat the first compartment, an air duct adapted to convey warm air from the heater into the first compartment, said duct having provided therethrough an opening adapted to be aligned with openings in the pallet and in the ceiling panel to allow the flow of warm air from the duct into the first compartment, a fan adapted to cool the second compartment; electrical service means adapted to supply electrical power to the heater and fan; and a refillable deodorizer adapted to freshen the air in the first compartment; attachment means adapted for mounting the deodorizer in the first compartment.

* * * * *